CONRAD JENSEN.
Improvement in Planes.

No. 126,707.  Patented May 14, 1872.

Witnesses,

Inventor,
Conrad Jensen

CONRAD JENSEN.
Improvement in Planes.
No. 126,707.　　　　　　　　　　Patented May 14, 1872.
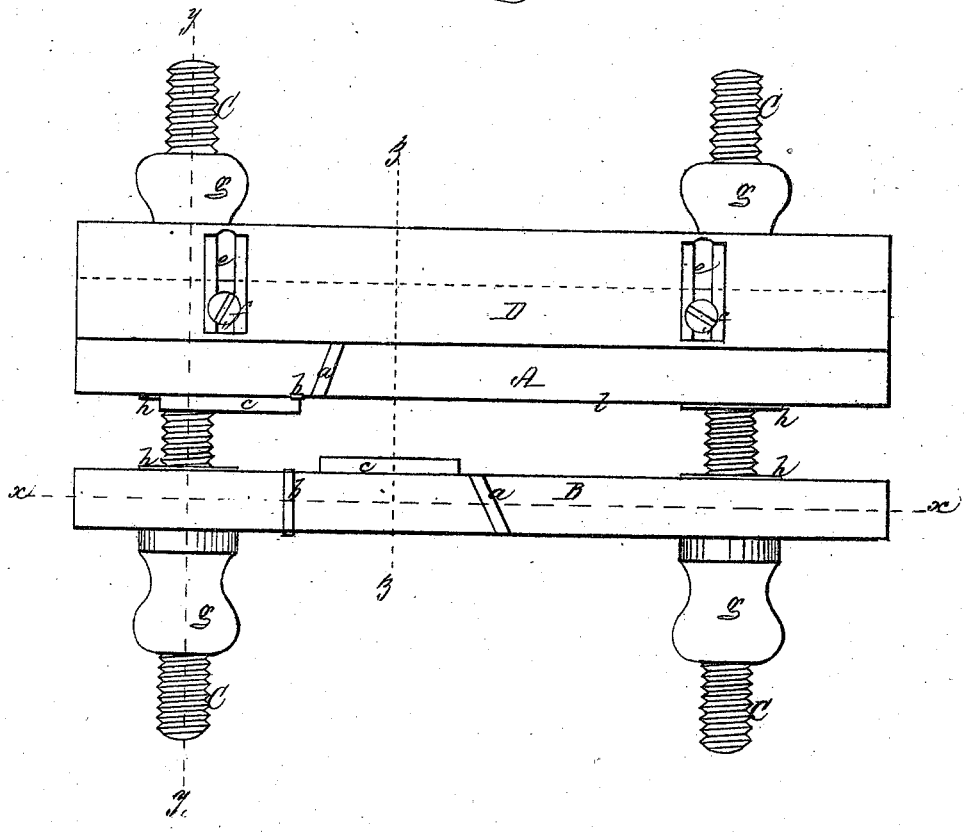
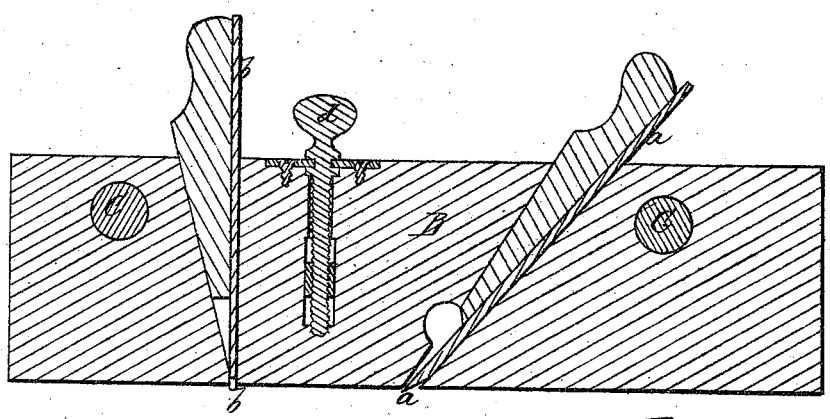
Witnesses,　　　　　　　　　　Inventor,
　　　　　　　　　　　　　　　Conrad Jensen 4 Sheets--Sheet 3.
CONRAD JENSEN.
Improvement in Planes.
No. 126,707. *Fig. 5* Patented May 14, 1872.
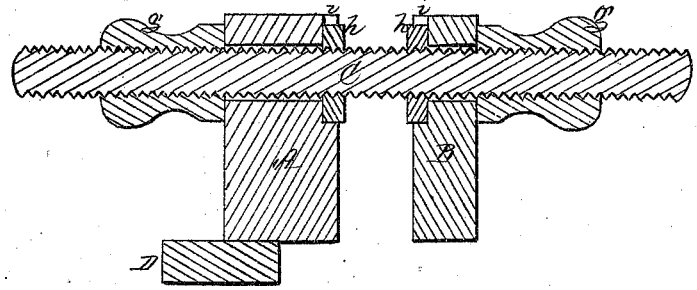
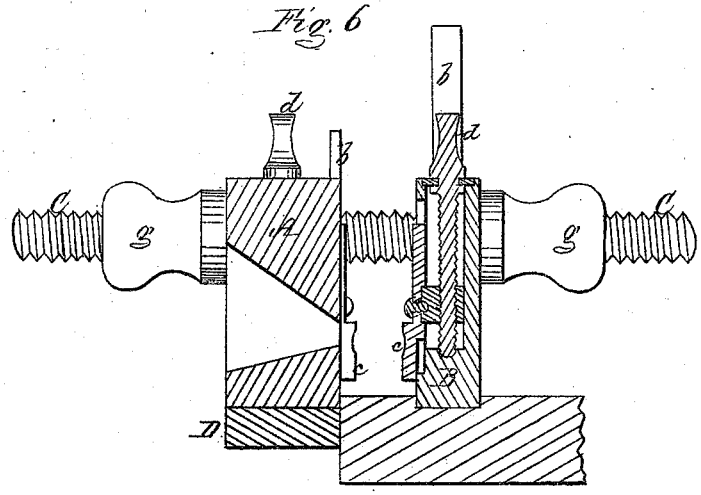
*Fig. 9.*
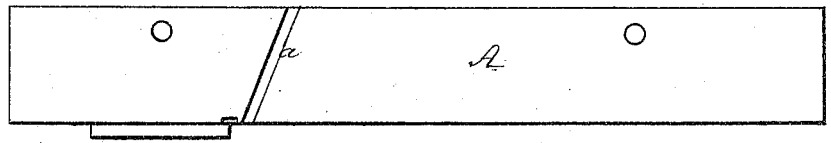
Witnesses,
Inventor,
Conrad Jensen CONRAD JENSEN.
Improvement in Planes.
No. 126,707.  Patented May 14, 1872.
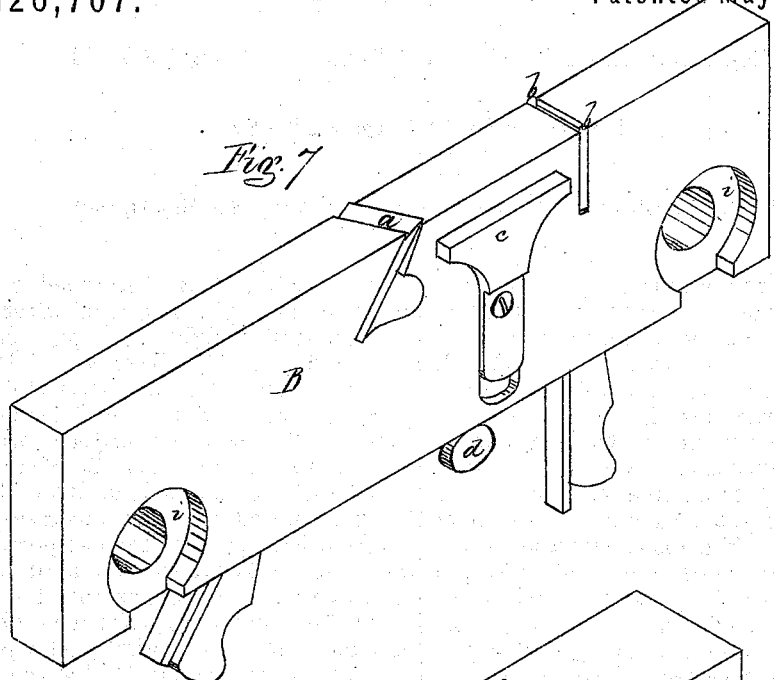
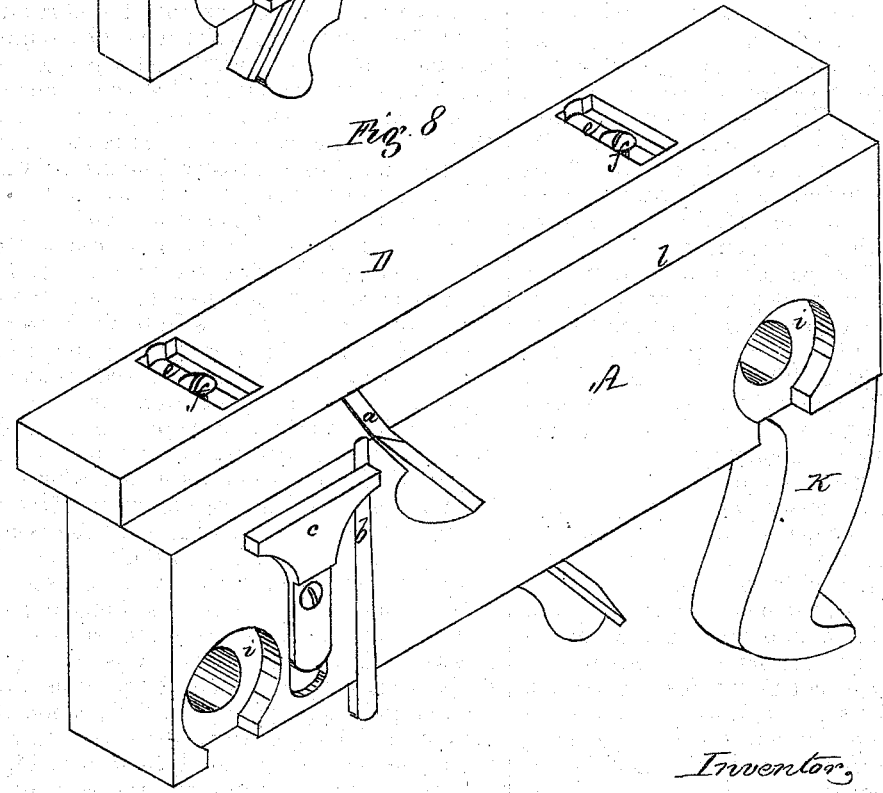
Witnesses,
Inventor,
Conrad Jensen

UNITED STATES PATENT OFFICE.

CONRAD JENSEN, OF BOSTON, MASSACHUSETTS.

IMPROVEMENT IN PLANES.

Specification forming part of Letters Patent No. 126,707, dated May 14, 1872.

*To all whom it may concern:*

Be it known that I, CONRAD JENSEN, of Boston, in the county of Suffolk and State of Massachusetts, have invented certain Improvements in Planes, of which the following is a full, clear, and exact description, reference being had to the accompanying drawing making part of this specification, in which—

Figure 1:
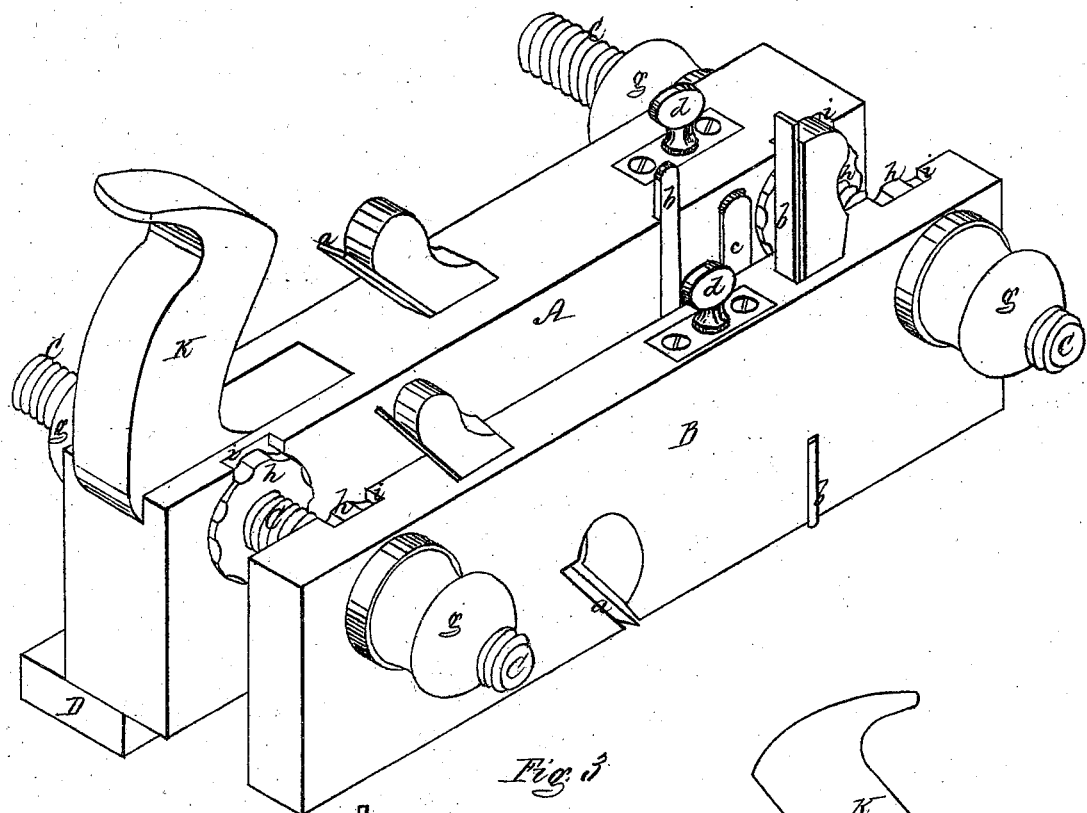
Figure 3:
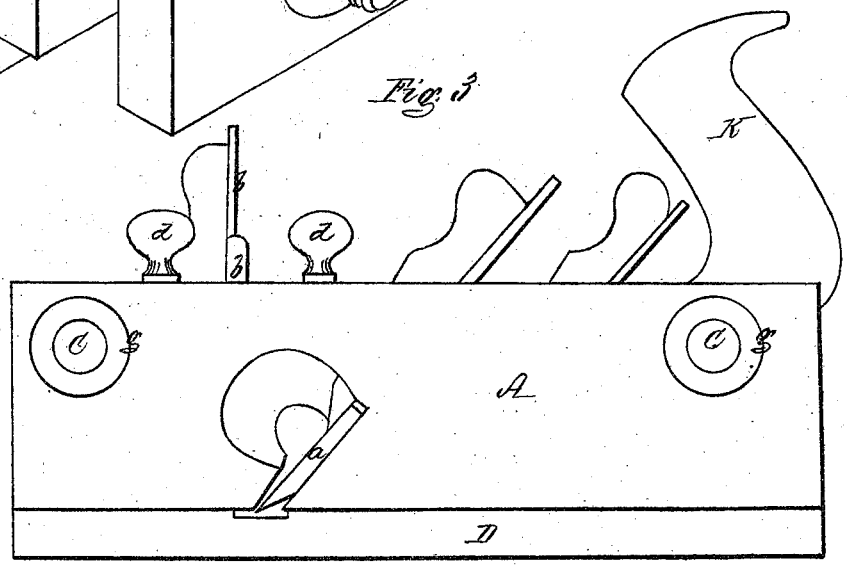

Figure 1 is a perspective view of my improved plane. Fig. 2 is a plan of the under side of the same. Fig. 3 is an elevation of the side of the plane opposite to that shown in Fig. 1. Fig. 4 is a longitudinal vertical section on the line $x\,x$ of Fig. 2. Fig. 5 is a transverse vertical section on the line $y\,y$ of Fig. 2. Fig. 6 is a transverse vertical section on the line $z\,z$ of Fig. 2. Fig. 7 is a perspective view of one portion of the plane detached and inverted. Fig. 8 is a perspective view of the other portion inverted. Fig. 9 is a plan of the under side of the portion of the plane shown in Fig. 8, with the gauge removed.

In "matching" boards of varying thicknesses it is customary to employ a "plow" plane for cutting the grooves, the plane being made adjustable, so as to insure the groove being in the required position, different irons being used for grooves of different widths. To cut tenons corresponding thereto has, however, heretofore necessitated the employment of a number of separate tools (one for each size of tenon) which were expensive, and required much time and care to keep in order. My invention has for its object to overcome these objections; and consists in a combination plane formed of two portions, each provided with an iron, and made adjustable to and from the other, by which construction tenons of various widths and depths may be cut in any desired position with one and the same tool, which can also be used as a "dado" plane; the two portions, (which are provided with suitable gauges and cutters,) when separated furnishing a "dado" plane, two "rabbet" planes, and a "fillister" plane.

To enable others skilled in the art to understand and use my invention I will proceed to describe the manner in which I have carried it out.

In the said drawing, A B represent the two portions of my improved plane, connected together by screws C provided with nuts. Each of the portions A B is provided with an iron, $a$, set at an angle, a vertical cutter, $b$, in front thereof, and a sliding gauge, $c$, on one side, operated by a thumb-screw, $d$. D is a longitudinal gauge, provided with slots $e$, and secured by screws $f$ to the under side of the portion A. The screws C are each provided with two nuts, $g\,g$, one on each side of the plane, and also with two nuts, $h\,h$, between the two portions A B, and fitting into recesses $i\,i$, formed therein, in order that the two portions may be brought nearly together; and it is by means of these nuts and screws that the portions A B are held firmly in position at any required distance from each other. The portion A is provided with a handle, K, by which the plane is operated. When it is desired to cut a tenon at a given distance from the edge of a board, the gauge D is set at a corresponding distance from the inner edge $l$ of the portion A. The distance apart of the portions A and B is now made to correspond to the required width of the tenon by operating the nuts $g\,h$, and the gauges $c$ are then adjusted to make the distance from their under side to the bottom of the portions A B equal to the required height of the tenon. It will thus be seen that I am enabled by a single plane to make a tenon of any required width and depth on a board or plank of any thickness, and situated at any required distance from its edge; whereas, it has heretofore required a different tool for every different size of tenon, which was necessarily in the center of the thickness of the board.

My improved plane may also be used as a "dado" plane, to cut a groove at any required distance, within the limits of the length of the screws C, from the edge of a board, by entirely covering the iron $a$ of the portion A with the gauge D, and adjusting the portion B at the required distance from the portion A, when the plane may be operated, as seen in Fig. 6, the gauge D resting against the edge of the board, and serving as a guide, and also preventing the iron $a$ of the portion A from cutting. The depth of the groove thus cut by the iron $a$ of the portion B is regulated by its gauge $c$, and its double cutter $b$ acts in advance of the iron $a$ in the usual manner.

When a groove is to be cut beyond the limits of the screws C the portion B is separated from the portion A and used alone, in which case it becomes an ordinary "dado" plane, and requires to be moved against a guide-strip, temporarily secured to the board, to give the required direction to the groove.

By removing the double cutter $b$ and gauge $c$ from the portion B, when detached, it becomes an ordinary narrow "rabbet" plane, which is a great advantage, as it has heretofore been impossible to convert a "dado" plane into a "rabbet" plane, on account of the shoulder on its under side.

When the portion B is detached, the portion A with its gauge D becomes a "fillister" plane, and by removing the gauges C D from the portion A it becomes a broad "rabbet" plane, a change which it has heretofore been impossible to make, for the reason that the iron in an ordinary "Fillister" plane extends only part way across its under surface, which prevents it from being used as a "rabbet" plane.

From the foregoing it will be seen that I combine in a single tool a tenon-cutter for cutting tenons of all sizes in every desired position, a "dado" plane, a "fillister" plane, and two "rabbet" planes, of different widths, while but two irons are used, which do not require to be changed in performing the various operations above referred to, and I am thus enabled to effect a great saving in tools and in the space required for the same, as well as in the labor of grinding, and care required to keep them in order.

What I claim as my invention, and desire to secure by Letters Patent, is—

I claim the tool as described, as a new article of manufacture.

Witness my hand this 5th day of March, A. D. 1872.

CONRAD JENSEN.

In presence of—
P. E. TESCHEMACHER,
W. J. CAMBRIDGE.